United States Patent Office 2,835,662
Patented May 20, 1958

2,835,662
COPPERABLE POLYAZO DYESTUFFS

Hans-Rudolf Byland, Riehen, Switzerland, assignor, by mesne assignments, to Saul & Co., Newark, N. J., as nominee of Fidelity Union Trust Company, executive trustee under Sandoz Trust No Drawing. Application May 28, 1956
Serial No. 587,484

Claims priority, application Switzerland June 3, 1955

6 Claims. (Cl. 260—172)

The present invention relates to copperable polyazo dyestuffs.

The copperable polyazo dyestuffs of the present invention may be represented by the formula

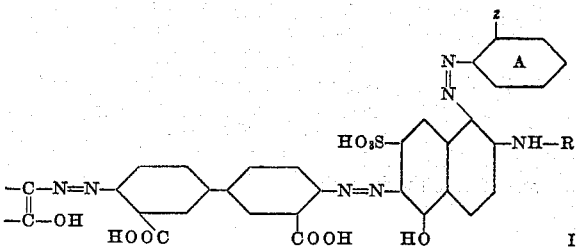

wherein R may be hydrogen, substituted or unsubstituted alkyl, cycloalkyl, aralkyl or aryl, z may be hydroxy or carboxy,

stands for the radical of a compound containing an enolizable keto group and capable of coupling in a position vicinal to the latter, and wherein nucleus A may contain further substituents.

The dyestuffs I, supra, can be prepared by coupling one mol of the tetrazo compound of a 4,4'-diamino-1,1'-diphenyl of the formula

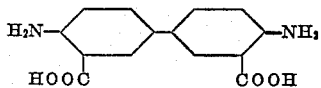

in any desired order of succession with one mol of an aminoazo compound of the formula

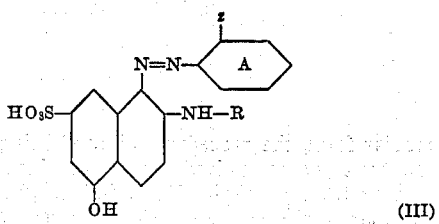

wherein R has the previously-recited significance, and z may be —OH or —COOH, and nucleus A may contain further substituents, and with one mol of a compound containing an enolizable keto group and capable of coupling in a position vicinal to the latter.

Illustrative of compounds which contain an enolizable keto group and are capable of coupling in a position vicinal to the latter are for example:

5-pyrazolones
Acylacetic acid amides
Acylacetic acid arylamides
Acylacetic acid alkylamides
Malonic acid derivatives
Barbituric acid derivatives
Acetylacetone
Benzoylacetone
4-hydroxy-1-alkylquinolines, and
Dihydroxyquinoline Especially useful 5-pyrazolones comprise:

3-methyl-5-pyrazolone
1-phenyl-3-methyl-5-pyrazolone
1-phenyl-3-methyl-5-pyrazolone-3'-sulfonic acid amide
1-phenyl-3-methyl-5-pyrazolone-4'-sulfonic acid amide
1-(3'-methylsulfonyl)-phenyl-3-methyl-5-pyrazolone
1-(4'-methylsulfonyl)-phenyl-3-methyl-5-pyrazolone
1-(3'-nitro)-phenyl-3-methyl-5-pyrazolone
1-(4'-nitro)-phenyl-3-methyl-5-pyrazolone
1-(3'-chloro)-phenyl-3-methyl-5-pyrazolone
1-(4'-chloro)-phenyl-3-methyl-5-pyrazolone
1-(2',5'-dichloro)-phenyl-3-methyl-5-pyrazolone, etc.

Even more important are the acylacetic acid arylamides and alkylamides, and particularly acetoacetylaminobenzene and its derivatives nuclearly substituted by halogen atoms, amino, nitro, alkylsulfonyl, sulfonic acid, sulfonic acid amide, carboxylic acid and/or azo groups; also 1 - acetoacetylaminonaphthalenes, 2 - acetoacetylaminonaphthalenes, 1 - acetoacetylaminonaphthalenemonosulfonic acids, 1-acetoacetylaminonaphthalene disulfonic acids, 2 - acetoacetylaminonaphthalenemonosulfonic acids and 2-acetoacetylaminonaphthalenedisulfonic acids, all of which may be further substituted. Illustrative of suitable acylacetic acid alkyl amides are 1-acetoacetylaminohexane
1-acetoacetylaminooctane
1-acetoacetylamino-2-ethylhexane
1-acetoacetylamino-2,2-dimethylethane, etc.

The compounds to be used as the second azo component, which couple in the adjacent position to an enolizable keto group, may be employed singly or in mixtures with one or more different compounds of the same type; the mixing proportions may vary from 1:0 through 1:1 to 0:1. Particularly interesting trisazo dyestuffs are obtained when a mixture of a 5-pyrazolone and an acetoacetic acid aryl amide is employed.

The coupling of the tetrazo compound of 4,4'-diamino-1,1'-diphenyl of Formula II with the aminoazo compound of Formula III is preferably carried out in a soda-alkaline medium. The resultant intermediate is either isolated or else used in solution, without special working up, and coupled with the azo component which contains an enolizable keto group and is capable of coupling in a position adjacent to such group. In order to accelerate the second coupling, it is advantageous to add to the reaction solution an organic tertiary base, such for example as pyridine, quinoline or a technical pyridine base mixture. The coupling of the tetrazo compound with the two azo components may also be carried out in the reverse order. The resultant polyazo dyestuffs are, if necessary, salted out of the reaction solution, filtered off and dried.

The so-obtained polyazo dyestuffs dye cotton and fibers of regenerated cellulose in violet-red shades which are displaced toward gray to deep black by aftertreatment with copper-yielding agents. The copper-containing dyeings are distinguished by outstanding fastness to light, to washing and to perspiration and by very good discharge-ability. By suitably selecting the water-solubilizing groups, dyestuffs with a high water-solubility are obtained. This property enables the dyestuffs to be brought onto the fiber by modern continuous dyeing methods. A further outstanding property of the new dyestuffs is that they reserve acetate silk.

The following examples set forth, by way of illustration, representative embodiments of the invention. In these examples, the parts and percentages are by weight; the temperatures are in degrees centigrade.

EXAMPLE 1

27.2 parts of 4,4'-diamino-1,1'-diphenyl-3,3'-dicarboxylic acid are tetrazotized. To the obtained tetrazo solution, ice-cold, there is added a solution of 51.4 parts of the aminoazo compound obtainable by acid coupling of diazotized 2-amino-1-hydroxybenzene-4-sulfonic acid amide with 2-phenylamino-5-hydroxynaphthalene-7-sulfonic acid, 10 parts of sodium carbonate and 900 parts of water. Thereupon a concentrated aqueous solution of 30 parts of sodium carbonate are forthwith run into the coupling mixture. The formation of the diazodisazo intermediate is completed in a short time. There is then added to the solution of the latter, a solution of 17.7 parts of acetoacetylaminobenzene in 600 parts of water, the mixture stirred for several hours while cooling with ice, and the resultant trisazo dyestuff salted out by the addition of sodium chloride. The dyestuff is then filtered off and dried. The new copperable trisazo dyestuff which corresponds to the formula

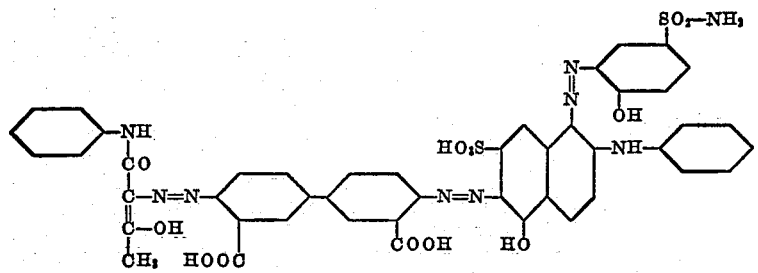

is a dark powder which dissolves in water to yield a violet-red colored solution and which dyes cotton and fibers of regenerated cellulose by the single-bath or two-bath coppering process in black shades of outstanding fastness to light, to washing and to perspiration.

10 parts of prewetted cotton are introduced into 300 parts of water at 40°. A concentrated aqueous solution of 0.8 part of the trisazo dyestuff of the formula set forth in the preceding paragraph is then added and the bath is heated to boiling within a period of 30 minutes. During the heating, 3 parts of sodium sulfate are added to the bath portionwise in the form of a concentrated aqueous solution. The bath is kept at the boil for 30 more minutes, 1 part of sodium sulfate is then added, after which the bath is allowed to cool slowly to 40°. The dyed material is then thoroughly washed, and then treated for 30 minutes at 70° in a fresh bath consisting of 300 parts of water, 0.3 part of acetic acid and 0.3 part of copper sulfate. The resultant metallized dyeing is rinsed and dried.

Instead of copper sulfate in the aftertreating bath, use may also be made of a polyalkylenepolyamine which contains copper in complex combination.

EXAMPLE 2

27.2 parts of 4,4'-diamino-1,1'-diphenyl-3,3'-dicarboxylic acid are tetrazotized. Then a neutral aqueous solution of 30.7 parts of 2-acetoacetylaminonaphthalene-6-sulfonic acid is run into the obtained tetrazo solution. 40 parts of sodium bicarbonate are then added portionwise to the mixture. Upon completion of the formation of the diazomonoazo intermediate, there is added to the reaction mass a solution of 48 parts of the aminoazo compound obtained by the acid coupling of diazotized 2-amino-1-hydroxy-4-nitrobenzene with 2-phenylamino-5-hydroxynaphthalene-7-sulfonic acid, 125 parts of technical pyridine base mixture and 300 parts of water. The precipitated trisazo dyestuff is filtered off and dried. It corresponds to the formula

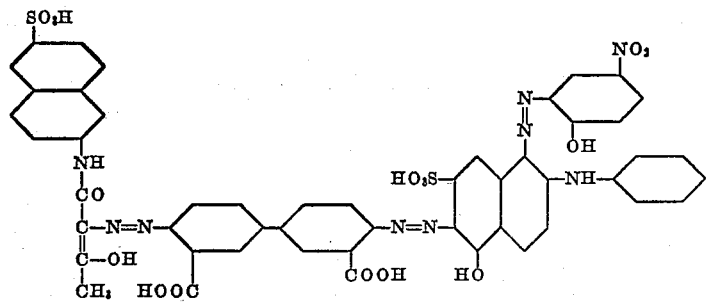

and is a dark powder which dissolves in water to yield a red-violet colored solution and whose coppered dyeings on cotton and fibers of regenerated cellulose are of a black shade which is fast to light, to washing and to perspiration.

The following table sets forth additional examples in tabular form, the procedure followed being according to the preceding examples. The so-obtained dyestuffs are built up from a 4,4'-diamino-1,1'-diphenyl of Formula II. To characterize the dyestuffs, column 1 sets forth the aminoazo compound of Formula III, and column 2 sets forth the second azo component. Column 3 indicates the shade of the coppered dyeings on cellulose fibers.

Table

| Example No. | (1) Aminoazo Compound III (a) −R | (1) (b) Radical− derived from— 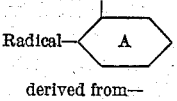 | (2) Second Azo Component | (3) Shade of the Coppered Dyeings on Cellulose Fibers |
|---|---|---|---|---|
| 3 | C₆H₅ | 2-amino-1-hydroxybenzene-4-sulfonic acid amide. | 1-acetoacetylaminobenzene-3-sulfonic acid amide. | black. |
| 4 | C₆H₅ | 2-amino-1-hydroxy-4-chloro-6-nitrobenzene. | ——do—— | Do. |
| 5 | C₆H₅ | 2-amino-1-hydroxybenzene-4-sulfonic acid amide. | 1-acetoacetylamino-2-methoxybenzene. | Do. |
| 6 | C₆H₄.CH₃ | ——do—— | 1-acetoacetylaminonaphthalene. | Do. |
| 7 | C₆H₅ | 2-amino-1-hydroxybenzene-5-sulfonic acid amide. | 1-phenyl-3-methyl-5-pyrazolone. | Do. |
| 8 | C₆H₄.Cl | 2-amino-1-hydroxy-4-methylsulfonylbenzene. | 1-phenyl-3-methyl-5-pyrazolone-3'-sulfonic acid amide. | Do. |
| 9 | C₆H₅ | 2-amino-1-hydroxybenzene-4-sulfonic acid methylamide. | 1-acetoacetylamino-2-chlorobenzene. | Do. |
| 10 | C₆H₅ | ——do—— | 1-acetoacetylamino-2,5-diethoxybenzene. | Do. |
| 11 | C₆H₅ | 2-amino-1-hydroxybenzene-4-sulfonic acid-(2'-hydroxy)-ethylamide. | 1-acetoacetylamino-2,5-dimethoxy-4-chlorobenzene. | Do. |
| 12 | C₆H₄.CH₃ | 2-amino-1-hydroxy-4-nitrobenzene. | 2-acetoacetylaminonaphthalene-6-sulfonic acid. | Do. |
| 13 | C₆H₅ | 2-amino-1-hydroxybenzene-4-sulfonic acid-(3'-methoxy)-propylamide. | 4-acetoacetylamino-1,1'-azobenzene-4'-sulfonic acid. | Do. |
| 14 | C₆H₅ | 2-amino-1-hydroxy-4-nitrobenzene. | 1-acetoacetylamino-2-methoxybenzene-x-monosulfonic acid. | Do. |
| 15 | C₆H₅ | ——do—— | 1-acetoacetylaminobenzene-4-carboxylic acid. | Do. |
| 16 | C₆H₅ | ——do—— | 2-acetoacetylaminonaphthalene-5-sulfonic acid. | Do. |
| 17 | C₆H₅ | ——do—— | 2-acetoacetylaminonaphthalene-7-sulfonic acid. | Do. |
| 18 | CH₃ | ——do—— | 1-acetoacetylaminobenzene-4-sulfonic acid. | Do. |
| 19 | C₆H₁₁ | ——do—— | Technical mixture of 1-acetoacetylamino-naphthalene-6- and -7-sulfonic acids. | Do. |
| 20 | CH₂.C₆H₅ | ——do—— | 1-acetoacetylaminonaphthalene-5-sulfonic acid. | Do. |
| 21 | C₆H₁₁ | ——do—— | 1-naphthyl(2')-3-methyl-5-pyrazolone-6'-sulfonic acid. | Do. |
| 22 | C₆H₅ | 2-amino-1-hydroxy-4-methylsulfonylbenzene. | 4-acetoacetylamino-1,1'-azobenzene-4'-sulfonic acid. | Do. |
| 23 | C₆H₅ | 2-amino-1-hydroxy-4-nitrobenzene. | 4-acetoacetylamino-1,1'-azobenzene-3,4'-disulfonic acid. | Do. |
| 24 | H | 2-amino-5-nitrobenzene-1-carboxylic acid. | acetoacetylaminobenzene. | Do. |
| 25 | C₆H₅ | 2-amino-5-nitrobenzene-1-carboxylic acid. | 1-acetoacetylamino-4-acetylaminobenzene. | Do. |
| 26 | C₆H₅ | 2-amino-1-hydroxybenzene-4-sulfonic acid. | 1-acetoacetylamino-4-hydroxybenzene. | Do. |
| 27 | C₆H₅ | 2-amino-1-hydroxy-4-nitrobenzene-6-sulfonic acid. | 5-acetoacetylamino-1,2,3,4-tetrahydronaphthalene. | Do. |
| 28 | C₆H₅ | 2-amino-1-hydroxybenzene-4-sulfonic acid. | 1-acetoacetylamino-4-acetylaminobenzene. | Do. |
| 29 | C₆H₅ | ——do—— | 1-acetoacetylamino-4-benzoylaminobenzene. | Do. |
| 30 | C₆H₅ | 2-amino-1-carboxybenzene-4-sulfonic acid. | 1-acetoacetylaminonaphthalene. | Do. |
| 31 | C₆H₅ | 2-amino-1-hydroxy-4-nitrobenzene-6-carboxylic acid. | 2-acetoacetylaminonaphthalene. | Do. |
| 32 | C₆H₅ | 2-amino-1-hydroxy-6-carboxybenzene-4-sulfonic acid. | 1-acetoacetylamino-5,6,7,8-tetrahydronaphthalene. | Do. |
| 33 | C₆H₅ | 2-amino-1-hydroxybenzene-4-sulfonic acid. | 1-acetoacetylaminobenzene-4-carboxylic acid-(4'-hydroxy-3'-carboxy)-phenylamide. | Do. |
| 34 | C₆H₅ | 2-amino-1-hydroxy-5-nitrobenzene. | 1-acetoacetylaminodiphenylamino-3-sulfonic acid. | Do. |
| 35 | C₆H₅ | ——do—— | 1-acetoacetylaminobenzene-2-sulfonic acid. | Do. |
| 36 | C₆H₅ | ——do—— | 1-acetoacetylaminobenzene-2-carboxylic acid. | Do. |
| 37 | C₆H₅ | 2-amino-1-hydroxybenzene-4-sulfonic acid. | acetoacetylaminobenzene. | Do. |
| 38 | C₆H₅ | 2-amino-1-hydroxy-4-nitrobenzene. | 1-acetoacetylamino-2-methoxybenzene monosulfonated. | Do. |
| 39 | C₆H₅ | 2-amino-1-hydroxybenzene-4-sulfonic acid. | 1-acetoacetylamino-4-methoxybenzene. | Do. |
| 40 | C₆H₅ | ——do—— | 1-benzoylacetylaminobenzene-3-sulfonic acid amide. | Do. |
| 41 | C₆H₅ | ——do—— | 2-benzoylacetylaminonaphthalene-6-sulfonic acid. | Do. |
| 42 | C₄H₉ | 2-amino-1-hydroxybenzene-4-sulfonic acid. | 1-acetoacetylaminobenzene-3-sulfonic acid amide. | Do. |
| 43 | C₆H₅ | 2-amino-1-hydroxybenzene-4-sulfonic acid. | mixture of 0.4 mol of acetoacetylaminobenzene and 0.6 mol of 1-acetoacetylaminobenzene-3-sulfonic acid amide. | Do. |
| 44 | C₆H₅ | ——do—— | mixture of 0.5 mol of 1-acetoacetylamino-4-chlorobenzene and 0.5 mol of 1-acetoacetylaminonaphthalene-5-sulfonic acid. | Do. |

EXAMPLE 45

27.2 parts of 4,4'-diamino-1,1'-diphenyl-3,3'-dicarboxylic acid are tetrazotized. To the obtained tetrazo solution, ice-cold, there is added a solution of 51.4 parts of the aminoazo compound obtainable by acid coupling of diazotized 2-amino-1-hydroxybenzene-4-sulfonic acid amide with 2-phenylamino-5-hydroxynaphthalene-7-sulfonic acid, 10 parts of sodium carbonate and 900 parts of water. Thereupon a concentrated aqueous solution of 30 parts of sodium carbonate are forthwith run into the coupling mixture. The formation of the diazodisazo intermediate is completed in a short time. There is then added to the solution of the latter, a solution of 8.9 parts of acetoacetylaminobenzene and 8.7 parts of 1-phenyl-3-methyl-5-pyrazolone in 600 parts of water and 4 parts of sodium hydroxide. The mass, ice-cooled, is stirred for several hours and the two trisazo dyestuffs thus formed are subsequently salted out by the addition of common salt, then filtered off and dried. They correspond to the formulae two-bath coppering processes in black shades of outstanding fastness to light, washing and perspiration.

For the mixture of acetoacetylaminobenzene and 1-phenyl-3-methyl-5-pyrazolone which forms the second azo component, mixing proportions different from 1:1 may be chosen, e. g., 5:1 or 2:1 or 1:3. Alternatively, the two constituents of the second azo component may be replaced by their derivatives substituted by halogen atoms, nitro, methoxy, ethoxy, methyl-sulfonyl and/or sulfonic acid amide groups.

EXAMPLE 46

When the 8.9 parts of acetoacetylaminobenzene employed in Example 45 as a constituent of the second azo component are replaced by 16.5 parts of sodium 2-acetoacetylaminonaphthalene-6-sulfonate, a trisazo dyestuff mixture is obtained, the dyeings of which also show excellent fastness properties.

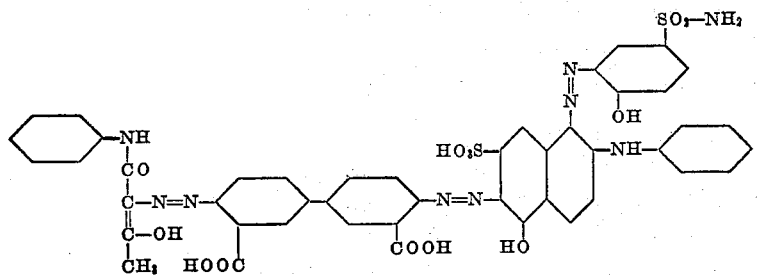

and

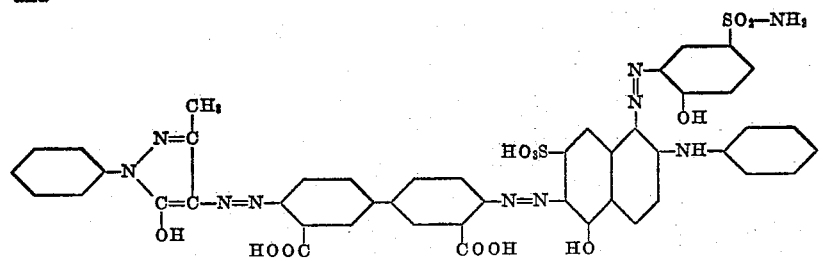

The trisazo dyestuff mixture is a dark-colored powder which dyes fibers of regenerated cellulose by the one- or The formulae of the two trisazo dyestuffs which form the mixture are

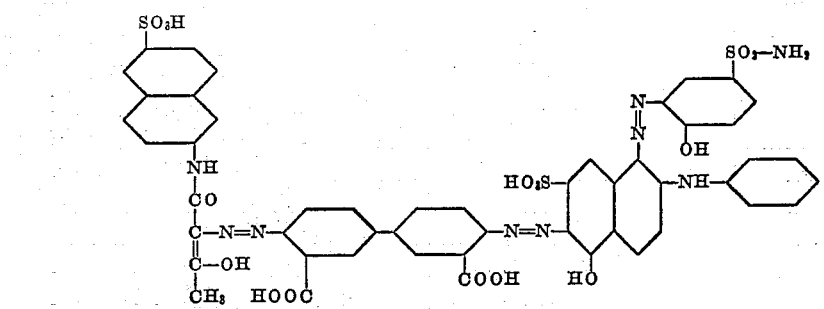

and

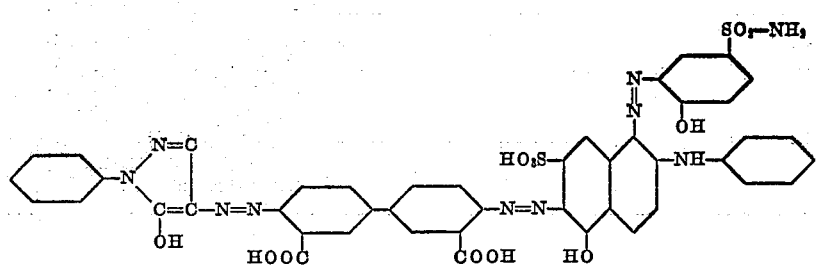

By varying the mixing proportions of the two constituents of the azo component, dyestuffs mixtures can be obtained whose coppered dyeings display a more greenish or more reddish shade than is the case when the mixing proportions given in the preceding paragraph are chosen.

In place of the 2-acetoacetylaminonaphthalene-6-sulfonic acid used in the present instance, other 2- or 1-acetoacetylaminonaphthalene monosulfonic acids as well as mixtures of such can be employed with equal success. It is also possible to replace the 1-phenyl-3-methyl-5-pyrazolone by 1-phenyl-3-methyl-5-pyrazolones substituted in the phenyl nucleus by halogen atoms, nitro, methylsulfonyl and/or sulfonic acid amide groups.

wherein R is a member selected from the group consisting of hydrogen, lower alkyl, cyclohexyl, benzyl and mononuclear carbocyclic aryl, z is selected from the group consisting of hydroxy and carboxy, $$\begin{array}{c}-C-\\ \parallel \\ -C-OH\end{array}$$

stands for the radical of a compound containing an enolizable keto group and capable of coupling in a position vicinal to the latter, and A is a phenyl group containing z in ortho-position to the adjacent —N=N— group.

2. The copperable trisazo dyestuff which corresponds to the formula

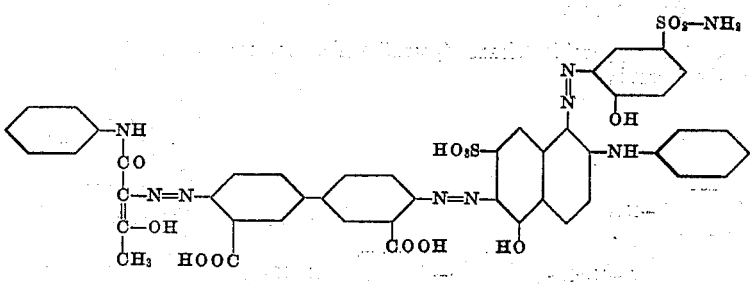

Formulae of representative dyestuffs set forth in the foregoing table are:

EXAMPLE 24

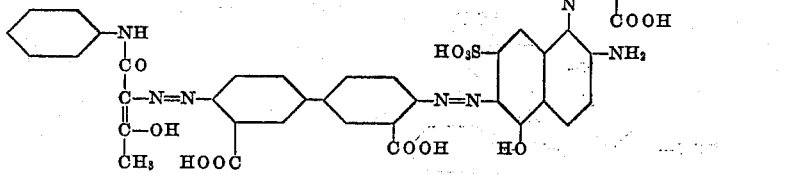

EXAMPLE 28

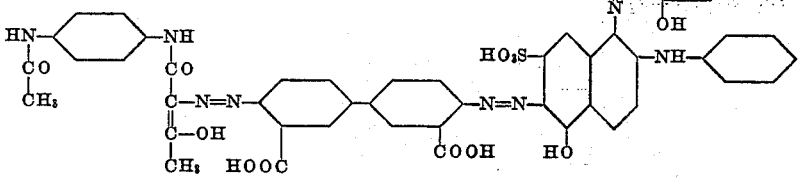

EXAMPLE 37

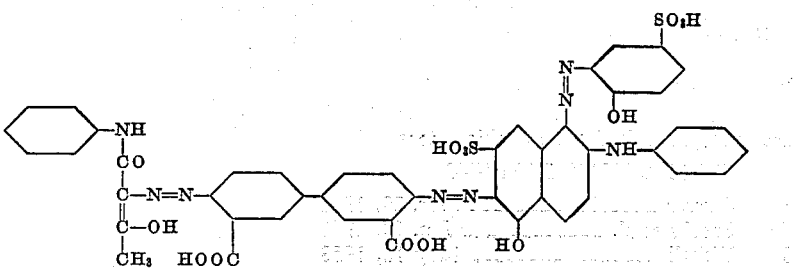

Having thus disclosed the invention what is claimed is:

1. Copperable polyazo dyestuffs which correspond to the formula

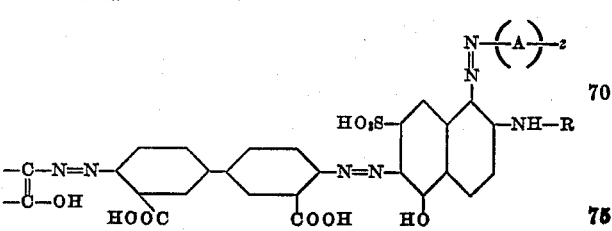

3. The copperable trisazo dyestuff which corresponds to the formula

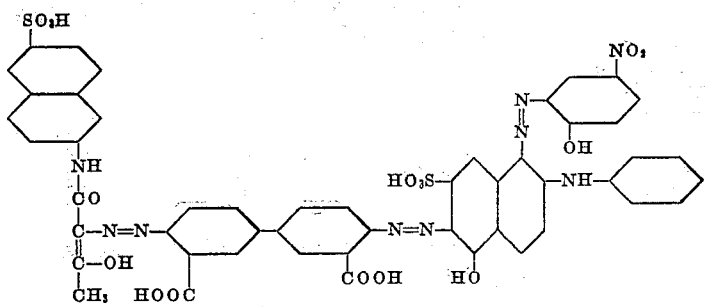

4. The copperable trisazo dyestuff which corresponds to the formula

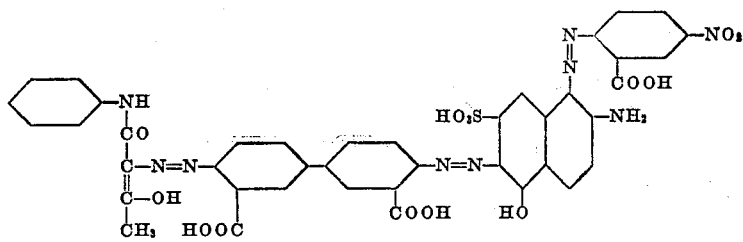

5. The copperable trisazo dyestuff which corresponds to the formula

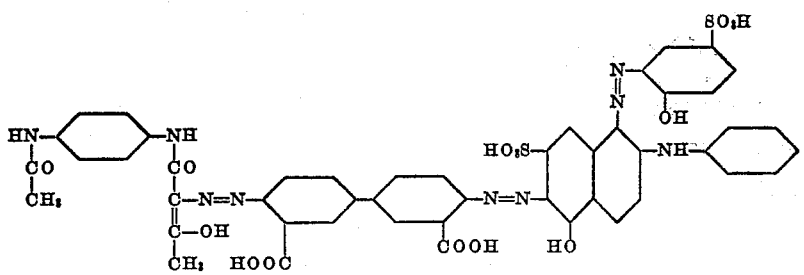

6. The copperable trisazo dyestuff which corresponds to the formula

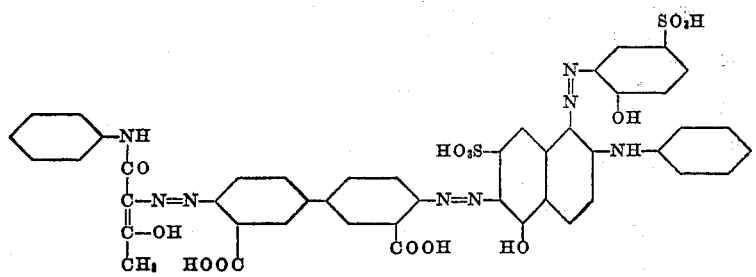

References Cited in the file of this patent
UNITED STATES PATENTS

| | | |
|---|---|---|
| 1,851,121 | Stusser | Mar. 29, 1932 |
| 2,228,416 | Sparks et al. | Jan. 14, 1941 |
| 2,638,468 | Wehrli | May 12, 1953 |